United States Patent
Altaparmakov

(10) Patent No.: US 10,452,618 B2
(45) Date of Patent: Oct. 22, 2019

(54) SYSTEMS AND METHODS FOR ENABLING MODIFICATIONS OF MULTIPLE DATA OBJECTS WITHIN A FILE SYSTEM VOLUME

(71) Applicant: Tuxera, Inc., Espoo (FI)

(72) Inventor: Anton Ivanov Altaparmakov, Great Chesterford (GB)

(73) Assignee: Tuxera Inc., Espoo (FI)

( * ) Notice: Subject to any disclaimer, the term of this patent is extended or adjusted under 35 U.S.C. 154(b) by 307 days.

(21) Appl. No.: 15/474,826

(22) Filed: Mar. 30, 2017

(65) Prior Publication Data

US 2017/0286446 A1    Oct. 5, 2017

Related U.S. Application Data

(60) Provisional application No. 62/317,375, filed on Apr. 1, 2016.

(51) Int. Cl.
| | | |
|---|---|---|
| G06F 17/00 | (2019.01) | |
| G06F 16/176 | (2019.01) | |
| G06F 16/11 | (2019.01) | |

(52) U.S. Cl.
CPC .......... G06F 16/1774 (2019.01); G06F 16/11 (2019.01)

(58) Field of Classification Search
CPC .... G06F 16/1774; G06F 16/11; G06F 3/0631; G06F 8/441; G06F 2009/45583; G06F 11/3006; G06F 11/3037; G06F 12/00; G06F 12/0871
USPC .................. 707/823, 801, 810, 828, 999.205
See application file for complete search history.

(56) References Cited

U.S. PATENT DOCUMENTS

| | | | | |
|---|---|---|---|---|
| 5,363,487 A | * | 11/1994 | Willman | G06F 16/10 710/8 |
| 5,819,298 A | * | 10/1998 | Wong | G06F 16/902 |
| 5,860,146 A | * | 1/1999 | Vishin | G06F 12/0284 710/3 |
| 5,893,157 A | * | 4/1999 | Greenspan | G06F 9/52 711/150 |
| 5,895,492 A | * | 4/1999 | Greenspan | G06F 9/526 711/147 |
| 5,930,467 A | * | 7/1999 | Morita | G06F 3/0613 358/1.16 |
| 5,930,831 A | * | 7/1999 | Marsh | G06F 3/0607 711/112 |
| 5,940,838 A | * | 8/1999 | Schmuck | G06F 12/0862 |
| 6,023,706 A | * | 2/2000 | Schmuck | G06F 16/1858 |
| 6,732,222 B1 | * | 5/2004 | Garritsen | G06F 3/0607 711/103 |

(Continued)

OTHER PUBLICATIONS

International Search Report and Written Opinion for PCT/US2017/025426 dated Jul. 27, 2017, pp. 11.

*Primary Examiner* — Mohammed R Uddin
(74) *Attorney, Agent, or Firm* — J. Fish Law, PLLC

(57) ABSTRACT

A device may be configured to perform techniques that enable may be used to allocate allocation units within a file system volume to data objects in a parallel manner. A file system driver may be configured to perform allocation operations based on an allocation mapping structure being logically partitioned into one or more of windows. Each window may be able to be lock independently during allocation operations. Window metadata may be used to evaluate windows of an allocation mapping structure.

20 Claims, 9 Drawing Sheets

(56) References Cited

U.S. PATENT DOCUMENTS

| | | | |
|---|---|---|---|
| 6,745,311 B2* | 6/2004 | Fabrizio | G01K 7/01 374/E7.035 |
| 9,767,107 B1* | 9/2017 | Bent | G06F 16/134 |
| 10,162,836 B1* | 12/2018 | Bent | G06F 16/1858 |
| 2001/0010065 A1* | 7/2001 | Chiba | G06F 3/0611 711/103 |
| 2002/0019907 A1* | 2/2002 | McMurdie | G06F 3/0608 711/112 |
| 2002/0133675 A1* | 9/2002 | Hirayama | G06F 3/0619 711/150 |
| 2003/0220923 A1* | 11/2003 | Curran | G06F 16/10 |
| 2004/0024981 A1* | 2/2004 | Iwatsu | G11B 20/00086 711/165 |
| 2004/0036780 A1* | 2/2004 | Toba | G06F 3/0605 348/231.2 |
| 2006/0020744 A1* | 1/2006 | Sinclair | G06F 12/0246 711/103 |
| 2006/0020745 A1* | 1/2006 | Conley | G06F 3/061 711/103 |
| 2006/0087957 A1* | 4/2006 | Kelly | G06F 3/0607 369/275.1 |
| 2006/0129749 A1* | 6/2006 | Nakanishi | G06F 3/0613 711/103 |
| 2007/0038689 A1* | 2/2007 | Shinkai | G06F 16/119 |
| 2008/0294648 A1 | 11/2008 | Lin et al. | |
| 2008/0307155 A1* | 12/2008 | Sinclair | G06F 3/061 711/103 |
| 2010/0082537 A1 | 4/2010 | Lasser | |
| 2010/0177250 A1* | 7/2010 | Hoshino | H04N 5/772 348/714 |
| 2010/0180255 A1* | 7/2010 | Chung | G06F 8/443 717/110 |
| 2010/0312807 A1* | 12/2010 | Mitsuzumi | G11B 20/1217 707/825 |
| 2012/0271988 A1* | 10/2012 | Yogev | G06F 3/0604 711/103 |
| 2013/0013563 A1 | 1/2013 | Prahlad et al. | |
| 2013/0067051 A1* | 3/2013 | Chadalapaka | G06F 8/65 709/223 |
| 2013/0151653 A1* | 6/2013 | Sawicki | G06F 15/17331 709/216 |
| 2015/0193460 A1* | 7/2015 | Altaparmakov | G06F 16/1847 707/823 |
| 2016/0041869 A1 | 2/2016 | Davis et al. | |
| 2017/0060702 A1* | 3/2017 | Dave | G06F 16/184 |

* cited by examiner

FIG. 5B

STATE AFTER 2ND ALLOCATION OPERATION

| FAT ENTRY | VALUE |
|---|---|
| 00 | MEDIA TYPE |
| 01 | PLACEHOLDER |
| 02 | EOF |
| 03 | 04 |
| 04 | 13 |
| 05 | 06 |
| 06 | 07 |
| 07 | 15 |
| 08 | 09 |
| 09 | 10 |
| 10 | EOF |
| 11 | 12 |
| 12 | EOF |
| 13 | 14 |
| 14 | EOF |
| 15 | 16 |
| 16 | EOF |
| 17 | |
| 18 | |
| 19 | |
| 20 | |
| 21 | |
| 22 | |

Entries 03–04: FILE_A; 05–06: FILE_B; 07–08: FILE_C; 09–10: FILE_D; 11–12: FILE_A; 13–14: FILE_B; 15–16: FILE_C ↑ 3RD Allocation Operation

STATE AFTER 3ND ALLOCATION OPERATION

| FAT ENTRY | VALUE |
|---|---|
| 00 | MEDIA TYPE |
| 01 | PLACEHOLDER |
| 02 | EOF |
| 03 | 04 |
| 04 | 13 |
| 05 | 06 |
| 06 | 07 |
| 07 | 15 |
| 08 | 09 |
| 09 | 10 |
| 10 | 17 |
| 11 | 12 |
| 12 | EOF |
| 13 | 14 |
| 14 | EOF |
| 15 | 16 |
| 16 | EOF |
| 17 | 18 |
| 18 | EOF |
| 19 | |
| 20 | |
| 21 | |
| 22 | |

Entries 03–04: FILE_A; 05–06: FILE_B; 07–08: FILE_C; 09–10: FILE_D; 11–12: FILE_A; 13–14: FILE_B; 15–16: FILE_C; 17–18: FILE_D ↑ 4TH Allocation Operation

STATE AFTER 4TH ALLOCATION OPERATION

| FAT ENTRY | VALUE |
|---|---|
| 00 | MEDIA TYPE |
| 01 | PLACEHOLDER |
| 02 | EOF |
| 03 | 04 |
| 04 | 13 |
| 05 | 06 |
| 06 | 07 |
| 07 | 15 |
| 08 | 09 |
| 09 | 10 |
| 10 | 17 |
| 11 | 12 |
| 12 | 19 |
| 13 | 14 |
| 14 | EOF |
| 15 | 16 |
| 16 | EOF |
| 17 | 18 |
| 18 | EOF |
| 19 | 20 |
| 20 | EOF |
| 21 | |
| 22 | |

Entries 03–04: FILE_A; 05–06: FILE_B; 07–08: FILE_C; 09–10: FILE_D; 11–12,19–20: FILE_A... (FILE_A, FILE_B, FILE_C, FILE_D extended)

PRE-ALLOCATED STATE

| | FAT ENTRY | VALUE |
|---|---|---|
| OFFSET | 00 | MEDIA TYPE |
| | 01 | PLACEHOLDER |
| | 02 | EOF |
| Window 1 | 03 | |
| | 04 | |
| | 05 | |
| | 06 | |
| | 07 | |
| Window 2 | 08 | |
| | 09 | |
| | 10 | |
| | 11 | |
| | 12 | |
| Window 3 | 13 | |
| | 14 | |
| | 15 | |
| | 16 | |
| | 17 | |
| Window 4 | 18 | |
| | 19 | |
| | 20 | |
| | 21 | |
| | 22 | |
| | ↓ | |
| Window N | CLUSTERCOUNT-3 | |
| | CLUSTERCOUNT-2 | |
| | CLUSTERCOUNT-1 | |
| | CLUSTERCOUNT | |
| | CLUSTERCOUNT+1 | |

FIG. 6

SYSTEMS AND METHODS FOR ENABLING MODIFICATIONS OF MULTIPLE DATA OBJECTS WITHIN A FILE SYSTEM VOLUME

RELATED APPLICATIONS

This application claims the benefit of U.S. Provisional Application No. 62/317,375, filed on Apr. 1, 2016, which is incorporated by reference in its entirety.

TECHNICAL FIELD

This disclosure relates to systems and methods for use with file systems and more particularly to techniques for modifying multiple data objects within a file system volume.

BACKGROUND

Devices including laptop or desktop computers, tablet computers, televisions, digital video recorders (DVRs), set-top boxes, digital media players, video gaming devices, video gaming consoles, video surveillance systems, and cellular telephones may utilize file systems to control how data is stored on and retrieved from a computer readable medium. For example, a device may read data from and write data to a storage device, such as, a memory card (e.g., a Secure Digital (SD) memory card, including Standard-Capacity (SDSC), High-Capacity (SDHC), and eXtended-Capacity (SDXC) formats), a hard disk drive, and/or a solid state drive including a Universal Serial Bus (USB) solid state drive (a so-called "flash," "thumb," or "jump" drive) according to a defined file system volume. Types of file systems include, for example, files systems based on the Extended File System (ext), file systems based on the Hierarchical File System (HFS), file systems based on the XFS file system, file systems based on the Z File System (ZFS), file systems based on the New Technology File System (NTFS), and file systems based on File Allocation Table (FAT) file systems, including the FAT12, FAT16, FAT32, exFAT, and transactional exFAT files systems. Respective data object (e.g., files) may be stored to a storage device within a volume. Multiple applications may instruct respective data objects stored to within volume to be modified. Current techniques for causing respective data object stored within a volume to be modified may be less than ideal.

SUMMARY

In general, this disclosure describes techniques for modifying multiple data objects within a file system volume. In particular, this disclosure describes techniques for enabling multiple data objects within a file system to be modified in a parallel manner. The techniques described herein may be used to allocate allocation units within a file system volume to files in a parallel manner. The techniques described herein may be a particular useful for user applications requiring multiple relatively large files to be stored to storage device simultaneously (e.g., recording multiple video streams). It should be noted that incorporation by reference of documents herein is for descriptive purposes and should not be constructed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

According to one example of the disclosure, a method for allocating clusters for storage of a data object comprises receiving an instruction corresponding to an allocation of clusters to the data object, locking a window of an allocation mapping structure assigned to the data object, allocating clusters to the data object, and unlocking the window assigned to the data object.

According to another example of the disclosure, a device for allocating clusters for storage of a data object comprises one or more processors configured to receive an instruction corresponding to an allocation of clusters to the data object, lock a window of an allocation mapping structure assigned to the data object, allocate clusters to the data object, and unlock the window assigned to the data object.

According to another example of the disclosure, a non-transitory computer-readable storage medium comprises instructions stored thereon, that upon execution, cause one or more processors of a device to receive an instruction corresponding to an allocation of clusters to the data object, lock a window of an allocation mapping structure assigned to the data object, allocate clusters to the data object, and unlock the window assigned to the data object.

According to another example of the disclosure, an apparatus for allocating clusters for storage of a data object comprises means for receiving an instruction corresponding to an allocation of clusters to the data object, means for locking a window of an allocation mapping structure assigned to the data object, means for allocating clusters to the data object, and means for unlocking the window assigned to the data object.

The details of one or more examples are set forth in the accompanying drawings and the description below. Other features, objects, and advantages will be apparent from the description and drawings, and from the claims.

BRIEF DESCRIPTION OF DRAWINGS

FIGS. 5A-5B is a conceptual diagram illustrating an example of causing respective allocation operations to be performed in a serial manner.

FIG. 6 is a conceptual diagram illustrating an example of logically organizing an allocation mapping structure according to one or more techniques of this disclosure.

DETAILED DESCRIPTION

Figure 1:
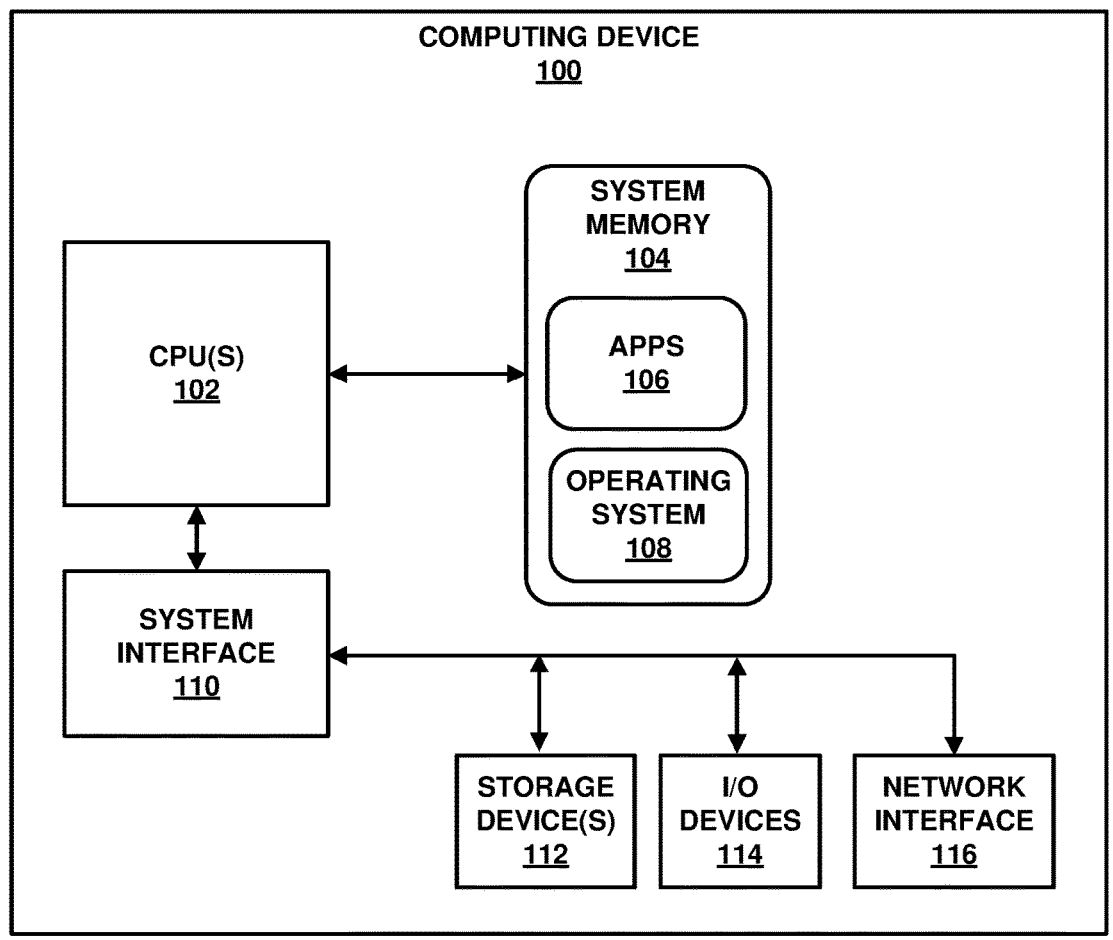
FIG. 1 is a block diagram illustrating an example of a computing device that may implement one or more techniques of this disclosure.

User data may be may arranged, organized, and/or managed on a storage device according to a defined file system.

For example, the Microsoft Extensible Firmware Initiative FAT32 File System Specification (version 1.03 Dec. 6, 2000), which is incorporated by reference in its entirety, defines aspects of the FAT32 file system and Microsoft exFAT Revision 1.00 File System Basic Specification (fourth release, 1 Jan. 2009), which is described in Appendix A of U.S. Pat. No. 8,321,439, and which is incorporated by reference in its entirety, defines aspects of the exFAT file system. Further, file systems may include other proprietary file systems. A file system may specify the structure and requirements of a volume, where a volume is a set of logical structures defined for a data space necessary to store and retrieve user data. As described in detail below with respect to FIG. 3, a volume may include boot record(s), file allocation table(s), allocation bitmaps, and user data. User data may include directories and files, and/or similar data structures. Each of a directory, file, and/or similar data structures may generally be referred to as a data object or data item. In Unix based file systems, the term inode may be used to refer to a file or a directory data object. As used herein the term inode may more generally refer to a data object associated with user data.

User data may be physically stored to one or more sectors of a storage device. File systems may define a cluster (or allocation unit) according to a number of sectors, where a cluster is the smallest logical unit of memory that can be allocated to a data object. Thus, one or more clusters are allocated to each data object stored on a storage device. File allocation table(s), allocation bitmap(s), and/or similar logical structures within a file system provide a mapping of data objects to one or more allocated clusters, and as such may be referred to as allocation mapping structures. As described in further detail below, file system drivers may allow an application and/or processes associated with an application to cause data objects to be modified on a storage device. For example, modifying a data object may include creating, adding additional data to, removing data from, or deleting a file. Modifying a data object may include allocating additional clusters to a data object or deallocating clusters from a data object. Further, file allocation table(s), allocation bitmap(s), and similar logical structures within a file system are updated as the allocation of clusters to a data object changes. For example, a document file generated using a word processing application may increase in size (i.e., include more data and require additional space on a storage device) as a user adds content to the document. The document file may increase in size in such a manner that additional clusters need to be allocated to the document file. In this case, the word processing application may issue one or more instructions (e.g., a write file command) to a file system driver and the file system driver may cause changes to occur to the volume in order to accommodate the increase in file size. For example, the file system driver may allocate additional clusters to the file, as necessary, write data to newly allocated clusters, update a file allocation table, and/or update an allocation bitmap.

In some cases, multiple applications may access respective data objects stored to a volume simultaneously. For example, a volume may store a data object corresponding to a word processing document file and store a data object corresponding to a digital image file. In this case, a word processing application may issue instructions to a driver to modify the file corresponding to the word processing document and a digital image editing application may issue instructions to the driver to modify the file corresponding to the digital image. In the case where clusters are allocated or deallocated for a data object, typically, a file system driver will lock an allocation mapping structure during allocations or deallocations. Typically, when the allocation mapping structure is locked for a particular allocation, other allocations or deallocations cannot occur until the allocation mapping structure is unlocked. For example, in the case where a file system includes a file allocation table, upon receiving an instruction requiring clusters to be allocated or deallocated for a first data object from a first application, the file system driver will typically lock the file allocation table, perform the operations associated with the instruction from the first application (e.g., allocate additional clusters, write data to the newly allocated clusters, and update the file allocation table), and unlock the file allocation table upon completion of the operations. In this case, if a second application issues an instruction requiring clusters to be allocated or deallocated for a second data object in a concurrent manner (e.g., prior to operations associated with the instruction issued by the first application being completed and/or the file allocation table being unlocked), the operations corresponding to the instructions issued by the second application are delayed until the file allocation table is unlocked. That is, conventional file system drivers perform allocations in a serial manner. Performing allocations in a serial manner may be less than ideal, particular in the case where frequent allocations are required. For example, a DVR device may record multiple television programs simultaneously and may require frequent allocations for each digital video file corresponding to a recorded television program. The techniques described herein may enable respective modifications associated with concurrently issued instructions to be performed in a parallel manner.

FIG. 1 is a block diagram illustrating an example of a computing device that may implement one or more techniques of this disclosure. Computing device 100 may include one or more processors and a plurality of internal and/or external storage devices. Examples of storage devices include file servers, FTP servers, network attached storage (NAS) devices, a local disk drive, removable memory devices, such as, for example, memory cards and USB memory devices, or any other type of device or storage medium capable of storing data. A storage medium may include an optical storage medium (e.g., DVDs, CD-ROMs, etc.), a magnetic storage medium, a flash memory, or any other suitable digital storage media. When the techniques described herein are implemented partially in software, a device may store instructions for the software in a suitable, non-transitory computer-readable medium and execute the instructions in hardware using one or more processors.

Computing device 100 is an example a computing device configured to store data on or retrieve data from a computer readable medium. Data may include, for example, application files, document files, media files (audio and/or video files), and the like. Computing device 100 may be equipped for wired and/or wireless communications and may include devices, such as, for example, desktop or laptop computers, mobile devices, smartphones, cellular telephones, tablet devices, set top boxes, DVRs, surveillance systems, personal gaming devices, and automotive infotainment systems. As illustrated in FIG. 1, computing device 100 includes central processor unit(s) 102, system memory 104, system interface 110, storage device(s) 112, input/output (I/O) device(s) 114, and network interface 116. As illustrated in FIG. 1, system memory 104 includes applications (apps) 106 and operating system 108. It should be noted that although example computing device 100 is illustrated as having distinct functional blocks, such an illustration is for descriptive purposes and does not limit computing device 100 to a particular hardware or software architecture. Functions of computing device 100 may be realized using any combination of hardware, firmware and/or software implementations.

Central processing unit(s) 102 may be configured to implement functionality and/or process instructions for execution in computing device 100. Central processing unit (s) 102 may be capable of retrieving and processing instructions, code, and/or data structures for implementing one or more of the techniques described herein. Instructions may be stored on a computer readable medium, such as system memory 104 or storage device(s) 112. Central processing unit(s) 102 may include digital signal processors (DSPs), general purpose microprocessors, application specific integrated circuits (ASICs), field programmable logic arrays (FPGAs), or other equivalent integrated or discrete logic circuitry. Central processing unit(s) 102 may include one or more multi-core central processing units. Central processing unit(s) 102 may operate according to a page size, where a page includes a fixed-length contiguous block of virtual memory. A common page size for central processing unit architectures is 4096 bytes (i.e., 4 kilobytes (kiB)). Other example page sizes may include 8 kiB, 16 kiB, 32 kiB, 64 kiB, etc.

System memory 104 may be configured to store information that may be used by computing device 100 during operation. System memory 104 may be described as a non-transitory or tangible computer-readable storage medium. In some examples, system memory 104 may provide temporary memory and/or long-term storage. In some examples, system memory 104 or portions thereof may be described as non-volatile memory and in other examples portions of system memory may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. In one example, system memory 104 may include an internal hard disk drive and/or an internal flash memory.

System interface 110 may be configured to enable communications between components of computing device 100. In one example, system interface 110 comprises structures that enable data to be transferred from one peer device to another peer device or to a storage medium. For example, system interface 110 may include a chipset supporting Peripheral Component Interconnect (PCI), Peripheral Component Interconnect Express (PCIe) bus protocols, proprietary bus protocols, or any other form of structure that may be used to interconnect peer devices.

Storage device(s) 112 represent memory of computing device 100 that may be configured to store different amounts of information for different periods of time than system memory 104. Similar to system memory 104, storage device(s) 112 may also include one or more non-transitory or tangible computer-readable storage media. Storage device(s) 112 may be internal or external memory and in some examples may include non-volatile storage elements. Storage device(s) may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive. Data stored on storage device(s) 112 may be stored according to a defined file system, such as, for example FAT12, FAT16, FAT32, exFAT, transactional exFAT, NTFS, and/or proprietary files systems.

I/O device(s) 114 may be configured to receive input and provide output for computing device 100. Input may be generated from an input device, such as, for example, a touch-sensitive screen, a track pad, a track point, a mouse, a keyboard, a microphone, one or more video cameras, or any other type of device configured to receive input. Output may be provided to output devices, such as, for example speakers or a display device. In some examples, I/O device(s) 114 may be external to computing device 100 and may be operatively coupled to computing device 100 using a standardized communication protocol, such as for example, Universal Serial Bus protocol (USB).

Network interface 116 may be configured to enable computing device 100 to communicate with external computing devices via one or more networks. Network interface 116 may be a network interface card, such as an Ethernet card, an optical transceiver, a radio frequency transceiver, or any other type of device that can send and receive information. Network interface 116 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

As illustrated in FIG. 1, system memory 104 includes applications 106 and operating system 108. Applications 106 may include any applications implemented within or executed by computing device 100 and may be implemented or contained within, operable by, executed by, and/or be operatively/communicatively coupled to components of computing device 100. Applications 106 may include instructions that may cause central processing unit(s) 102 of computing device 100 to perform particular functions. Applications 106 may cause central processing unit(s) 102 to write data to or read data from a computer readable medium, such as for example, system memory 104 and/or storage device(s) 112. Applications 106 may include algorithms which are expressed in computer programming statements, such as, for loops, while-loops, if-statements, do-loops, etc.

As further illustrated in FIG. 1, applications 106 may execute on top of operating system 108. Operating system 108 may be configured to facilitate the interaction of applications 106 with central processing unit(s) 102, and other hardware components of computing device 100. Operating system 108 may be an operating system designed to be installed on laptops and desktops. For example, operating system 108 may be a Windows® operating system, Linux, or Mac OS. Operating system 108 may be an operating system designed to be installed on smartphones, tablets, set-top boxes, and/or gaming devices. For example, operating system 108 may be a Windows®, Linux, Mac OS, Android, iOS, Windows Mobile®, or a Windows Phone® operating system. It should be noted that although techniques may be described according to particular example operating systems, the techniques described herein are not limited to a particular operating system.

Figure 2:
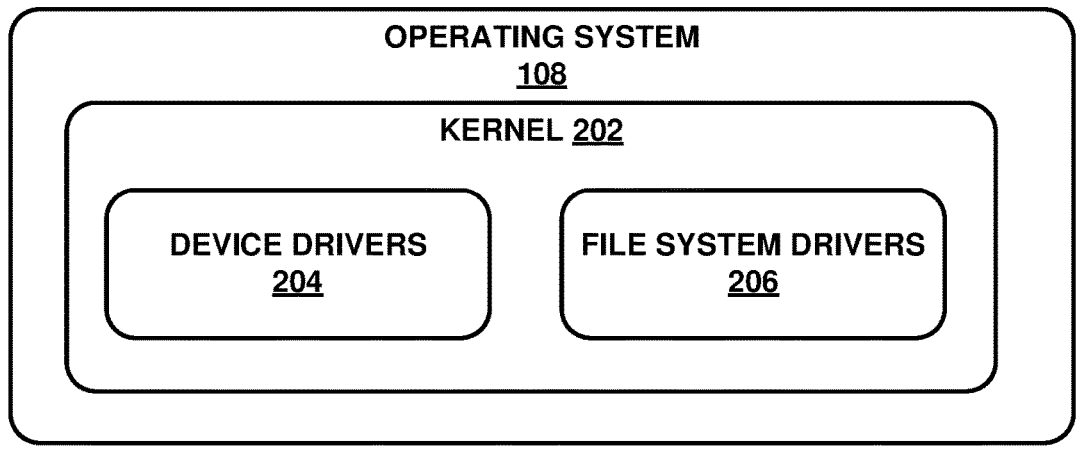
FIG. 2 is a block diagram illustrating an example of an operating system of a computing device that may implement one or more techniques of this disclosure.

FIG. 2 is a block diagram illustrating an example of an operating system of a computing device that may implement one or more techniques of this disclosure. As illustrated in FIG. 2, operating system 108 includes kernel 202. In one example, kernel 202 may be a kernel based on a Linux kernel. In other examples, kernel 202 may be a component or subset of instructions of an operating system. As illustrated in FIG. 2, kernel includes device drivers 204 and file system drivers 206. Device drivers 204 may be configured to operate as an interface between operating system 108 and hardware devices, such as, for example, system interface 110. File system drivers 206 may be configured to provide a layer of abstraction between applications 106 and/or operating system 108 and a storage device, such as, for example system memory 104 and/or storage device(s) 112. For example, file system drivers 206 may allow an application to modify a data object on storage device(s) 112 without requiring the application to perform aspects of file management. Modifying a data object may include any type of data change within a volume, from creating, modifying, renaming, or deleting a file to creating, modifying, renaming, moving, or deleting a directory. As described in detail below, modifying a data object may include modifying a boot record, modifying directory entries, modifying a file allocation table, modifying an allocation bitmap, allocating clusters, and/or deallocating clusters. In one example, file system drivers 206 may be configured to allow data to be stored to system memory 104 and/or storage device(s) 112 according to a file system based on a File Allocation Table (FAT) file system, including FAT12, FAT16, FAT32, exFAT, transactional exFAT, NTFS, and/or proprietary files systems. It should be noted that in some examples, file system drivers 206 may be implemented as one driver binary that implements multiple file systems (e.g., both FAT and exFAT file systems). In other examples, file system drivers 206 may include a separate binary driver for respective file systems.

Figure 3:
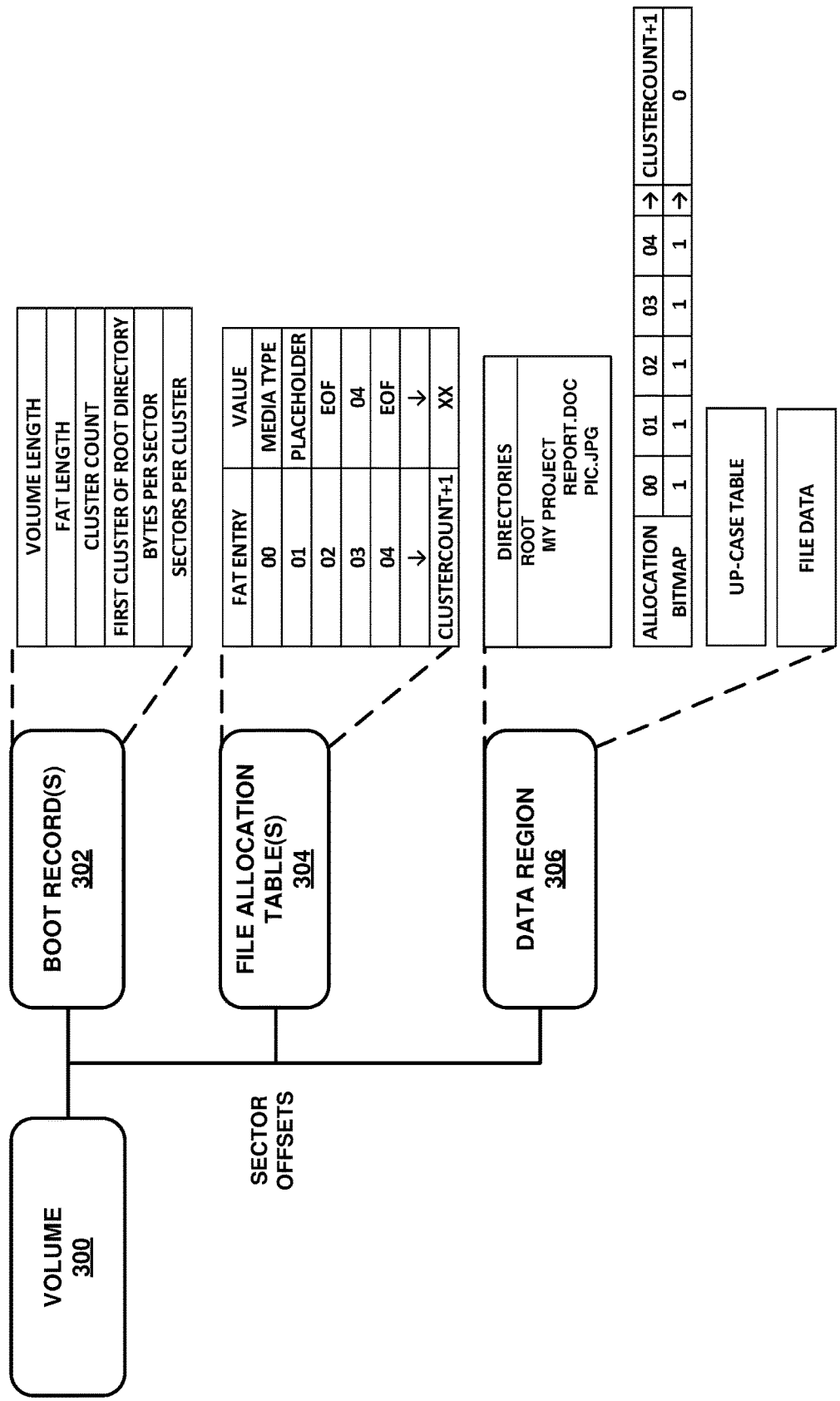
FIG. 3 is a conceptual diagram illustrating an example of a volume defined according to an example file system.

FIG. 3 is a conceptual diagram illustrating an example of a volume defined according to an example file system. In one example, volume 300 may be defined according to the exFAT file system. It should be noted that although in some examples volume 300 is described with respect to an exFAT file system, the techniques described herein are not limited to an exFAT file system and may be used with other file systems, including, for example, FAT12, FAT16, FAT32, and proprietary file systems. Further, it should be noted that example volume 300 represents an illustrative example of a volume and, for the sake of brevity, is not intended as an exhaustive description of a volume defined according to a file system. Additional details of a volume may be found in a corresponding file system specification. For example, in the case where volume 300 is defined according to a file system based on the exFAT file system, additional details of volume 300 may be found in the Microsoft exFAT Revision 1.00 File System Basic Specification (fourth release, 1 Jan. 2009). In the case where volume 300 is defined according to a file system based on the one or more of the FAT12, FAT16, and FAT32 file systems, additional details of volume may be found in the Microsoft Extensible Firmware Initiative FAT32 File System Specification (version 1.03 Dec. 6, 2000).

In the example illustrated in FIG. 3, volume 300 includes boot record(s) 302, file allocation table(s) 304, and data region 306. Each of boot record(s) 302, file allocation table(s) 304, and data region 306 may be addressable on a storage device, such as, and for example, storage device(s) 112, according to a sector value. Boot record(s) 302 include data entries describing file system parameters. In one example, boot record(s) 302 include data for bootstrapping the volume, fundamental file system parameters for the volume, and various error checking information. Boot record(s) 302 may include one or more boot records. In one example, boot record(s) 302 include a primary boot record and a backup boot record, where the backup boot record is a replica of the primary boot record. As illustrated in FIG. 3, examples of information included in boot record(s) 302 include volume length, file allocation table length, cluster count, first cluster of root directory, bytes per sector, and sectors per cluster. In one example, volume length specifies the size of the volume 300 in sectors. In one example, file allocation table length specifies the size of a file allocation table 304 in sectors. In one example, cluster count specifies the number of clusters included in data region 306. It should be noted that although not illustrated in FIG. 3, boot record(s) 302 may also include information indicating a percentage of clusters which are allocated and information that allows volume 300 to be boot-strapped. As described in detail below, boot record(s) 302 may be updated as files and directories are modified. In one example, first cluster of root directory specifies a sector location of the root directory in data region 306.

In one example, bytes per sector specifies the number of bytes included in a sector. In one example, the number of bytes per sector may be expressed in power of 2 notation and may range from a minimum of 512 bytes per sector to a maximum of 4096 bytes per sector. In one example, sectors per cluster specifies the number of sectors per cluster. In one example, the minimum number of sectors per cluster may be one and the maximum number of sectors per cluster may provide for a maximum cluster size of 32 kiB. It should be noted that, in some examples, the size of a cluster may be dependent on the volume size. For example, for standard compliant FAT volumes for the largest volumes, defined as volumes greater than 32 Gigibytes (GiB) (where 1 GiB is $1,024^3$ bytes), the cluster size would be the maximum cluster size for FAT, which is 32 kiB (e.g., 64 sectors of 512 bytes or 8 sectors of 4096 bytes). A standard compliant 32 GiB FAT volume would use clusters having a size of 16 kiB. A standard compliant 16 GiB FAT volume would use 8 kiB clusters. A standard compliant 8 GiB FAT volume would use 4 kiB clusters.

File allocation table(s) 304 may include one or more file allocation tables. In one example, file allocation table(s) 304 includes a single file allocation table 304. In another example, file allocation table(s) 304 includes two or more file allocation tables. File allocation table(s) 304 may be used to describe a sequence of clusters (also, referred to as a chain of clusters) that are allocated to a data object, such as a file, in data region 306. As illustrated in FIG. 3, a file allocation table may include an entry and a value corresponding to the entry. In the example illustrated in FIG. 3, entry 00 includes a value indicating a media type and entry 01 includes a placeholder value. Entries 02 through ClusterCount+1 may provide information describing sequences of clusters allocated to a data object. In one example, entries may include a value indicating a subsequent cluster entry in a sequence of clusters, a value indicating a "bad" cluster, a value indicating that the cluster is not in use, or a value indicating the end of a sequence of clusters (EOF).

In the example illustrated in FIG. 3, root file directory begins at cluster 02. As illustrated in FIG. 3, entry 02 includes an EOF marker which indicates that the root directory is not assigned any additional clusters. Further, in the example illustrated in FIG. 3, a file begins at cluster 03. As illustrated in FIG. 3, entry 03 includes an address of 04, indicating that the next cluster in the sequence for the file is cluster 04. Entry 04 includes an EOF marker which indicates that the file is not allocated any additional clusters. In this manner, file allocation table(s) may be used to identify a sequence of clusters allocated to a data object. It should be noted that although in the example illustrated in FIG. 3 that the clusters allocated to an data object are consecutive, in other examples, clusters allocated to an data object may include clusters that are not consecutive (e.g., entry 03 pointing to entry 07, etc.).

Data region 306 may be the region of volume 300 where data that makes up a data object is stored. For example, data region 306 may include data objects representing one or more types of files. For example, data region 306 may include a word processing document, such as, for example, a Microsoft Word document, a media files, such as, for example, a JPEG file, video files, and/or other types of files. In some examples, data region 306 may be referred to a cluster heap. As described above, information regarding the configuration of data region 306 may be included in boot record(s) 302 (e.g., cluster count and percentage of clusters allocated). It should be noted that in most cases, boot record(s) 302 are typically updated on a mounting event. As further described above, a modification to a data object stored in data region 306 may require file allocation table(s) 304 to be updated. As illustrated in FIG. 3, data region includes directories, allocation bitmap, UP-case table, and file data. Directories may include a series of entries describing a tree structure which indicates a relationship between files and directories. For example, directories may indicate that a particular file is stored in a sub-directory of a parent directory. In the example illustrated in FIG. 3, directories include a root directory and a "My Project" sub-directory and a word processing document file, ("Report.doc"), and a picture file, ("Pic.jpg"), are stored within the "My Project" directory. In the example illustrated in FIG. 3, the root directory may include general information about the volume and the data region, for example, the location of the allocation bitmap, when the volume includes an allocation bitmap. It should be noted that directory entries may include one or more records of different types (e.g., a directory entry record, a stream extension record, file name extension record(s), etc.) as defined according to a file system. One or more records may map a data object to a data region. For example, a first cluster field in a record may providing an initial mapping of a file to one or more clusters of data. As data objects stored to a volume are modified, the records may be updated. For the sake of brevity a complete discussion of record types is not provided herein.

Referring again to FIG. 3, allocation bitmap may maintain the allocation state of the clusters in data region 304 and may be used to determine which clusters in a volume are currently available to write to, i.e., not currently allocated. As illustrated in the example of FIG. 3, allocation bitmap includes an entry corresponding to each cluster of data region 306, where a binary value of "1" indicates that a particular cluster is allocated and a binary value of "0" indicates that a cluster is deallocated. It should be noted that although some file systems, such as, for example FAT12, FAT16, and FAT32 may not include an allocation bitmap. The techniques described herein may be used with file systems that include or do not include an allocation bitmap. Referring again to FIG. 3, in the example of exFAT, UP-case table may contain data for converting lower-case characters to upper case characters. For example, UP-case table may include an array of Unicode characters. In the example of exFAT, file names may be stored in a case insensitive manner and file names may be converted to upper-case during search operations. It should be noted that in the examples of FAT12, FAT16, and FAT32, data region 306 does not include UP-case table. File data may include data representing a file, such as, for example, Report.doc and Pic.jpg in the example of FIG. 3.

As described above, operating system 108 and/or file system drivers 206 may be configured to cause data to be stored to a storage device according to a volume based on instructions received by one or more applications. In one example, operating system 108 and/or file system drivers 206 may be configured to allocate clusters and deallocate clusters. It should be noted that when modifications of a data object involve more than one sector, such modifications may be referred to as not atomic (e.g., single sector writes are considered to be atomic). As described above, in some cases, multiple applications may issue instructions requiring clusters to be allocated or deallocated for a data object to a file system driver in a concurrent manner. Further, it should be noted that in some cases a single application may issue instructions requiring clusters to be allocated or deallocated for a data object to a file system driver in a concurrent manner (e.g., a DVR application recording multiple television programs simultaneously).

Figure 4:
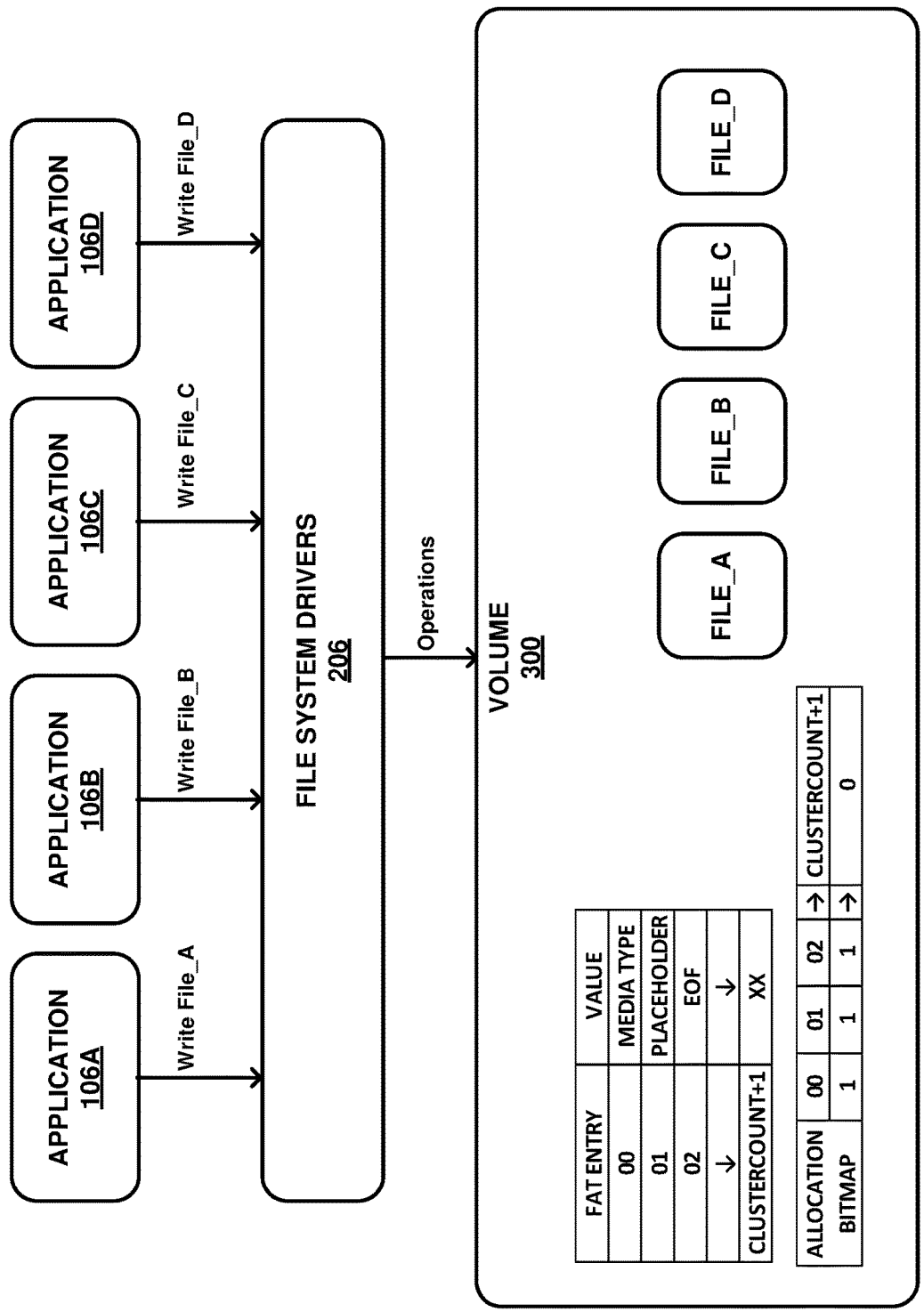
FIG. 4 is a conceptual diagram illustrating an example of multiple applications instructing respective data objects stored to a volume to be modified.

FIG. 4 is a conceptual diagram illustrating an example of multiple applications issuing instructions corresponding to respective data objects stored to a volume. In the example illustrated in FIG. 4, data objects, File_A, File_B, File_C, and File_D, are stored on volume 300 and each of application 106A, application 106B, application 106C, and application 106D are issuing respective write commands associated with File_A, File_B, File_C, and File_D to file system drivers 206 (i.e., Write File_A, Write File_B, Write File_C, and Write File_D). As described above, a typical file system driver will lock allocation mapping structures (i.e., the FAT and allocation bitmap in FIG. 4) for allocation operations associated with an instruction, thereby causing concurrent allocation operations and, potentially, instructions to be performed in a serial manner.

Figure 5A:
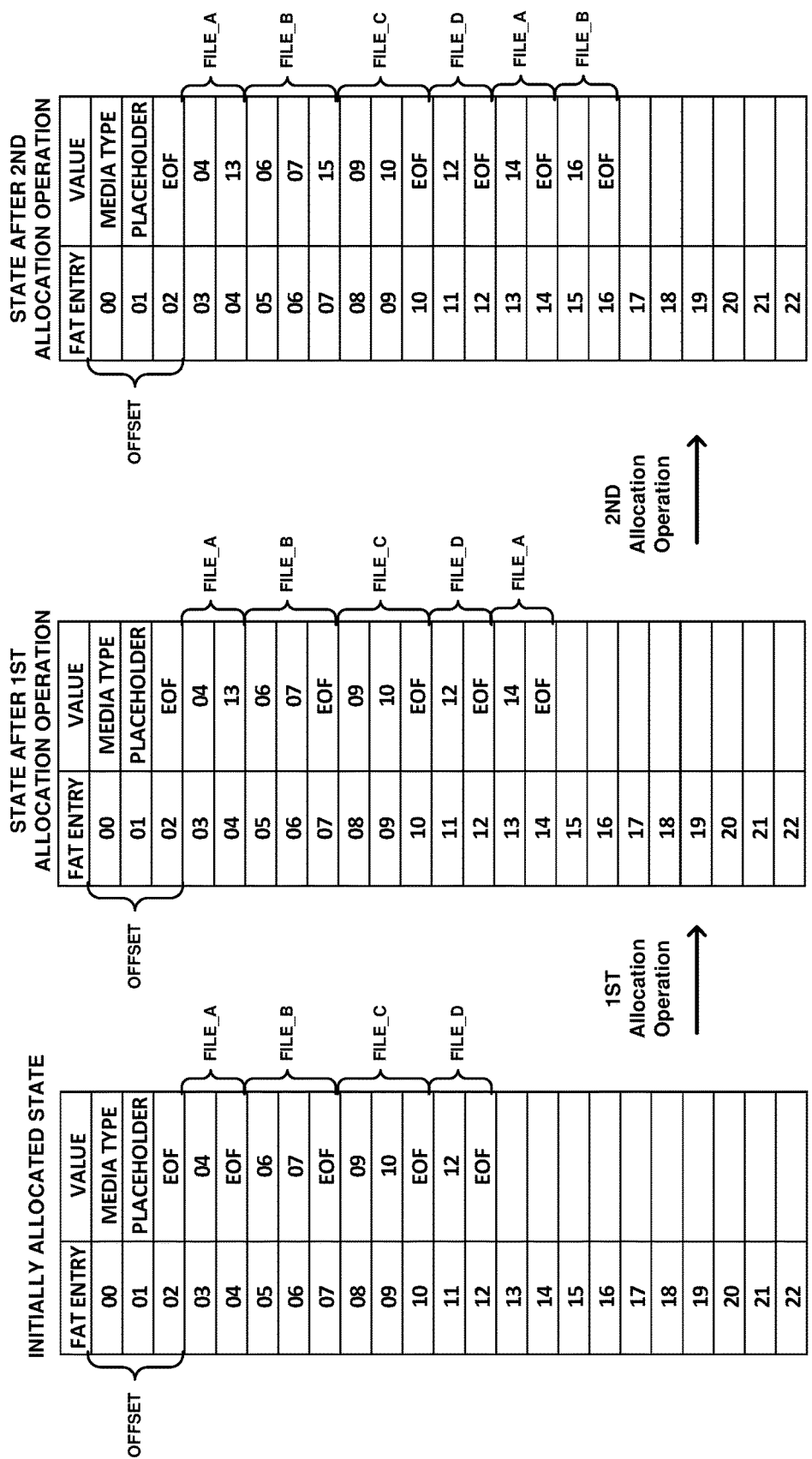

FIGS. 5A-5B is a conceptual diagram illustrating an example of causing respective allocation operations to be performed in a serial manner. As described above, a file allocation table describes a chain of clusters allocated to a data object. Referring to FIGS. 5A-5B, causing clusters to be allocated to respective data objects stored to a volume is illustrated with respect to modification of file allocation table entries. It should be noted, however, as described above, modifications of a data object requiring clusters to be allocated or deallocated may include additional modifications to logical structures of a volume (e.g., records are updated, file data is updated, and/or an allocation bitmap is updated). Referring to FIGS. 5A-5B, the example illustrates a file allocation table at an initially allocated state (i.e., files File_A, File_B, File_C, and File_D are stored to a the volume) and the file allocation table at subsequent intermediate states corresponding to a file system driver performing respective operations associated with Write File_A, Write File_B, Write File_C, and Write File_D commands being performed in a serial manner. In the example illustrated in FIGS. 5A-5B each of Write File_A, Write File_B, Write File_C, and Write File_D require additional clusters to be allocated to respective files File_A, File_B, File_C, and File_D. Further, in the example illustrated in FIGS. 5A-5B, the file allocation table is locked when clusters are being allocated to a particular file. That is, in the example illustrated in FIGS. 5A-5B: the first allocation operation includes locking the file allocation table, allocating two additional clusters to File_A, and upon completion of allocating additional clusters to File_A, unlocking the file allocation table; the second allocation operation includes locking the file allocation table, allocating two additional clusters to File_B, and upon completion of allocating additional clusters to File_B, unlocking the file allocation table; the third allocation operation includes locking the file allocation table, allocating two additional clusters to File_C, and upon completion of allocating additional clusters to File_C, unlocking the file allocation table; and the fourth allocation operation includes locking the file allocation table, allocating two additional clusters to File_D, and upon completion of allocating additional clusters to File_D, unlocking the file allocation table, where each allocation operation must wait until the file allocation table is unlocked to commence. It should be noted that in the example illustrated in FIGS. 5A-5B, the next available free cluster is used for allocations and as a result as illustrated in FIG. 5B, each of File_A, File_B, File_C, and File_D are interleaved and fragmented.

In one example, according to the techniques described herein, file system drivers 206 may be configured to perform allocation operations in a parallel manner. That is, file system drivers 206 may be configured to perform allocation operations based on an allocation mapping structure being logically partitioned into one or more of windows. FIG. 6 is a conceptual diagram illustrating an example of logically organizing an allocation mapping structure according to one or more techniques of this disclosure. In the example illustrated in FIG. 6, a file allocation table includes an offset region and a region partitioned into a plurality of windows. An offset region may correspond to clusters including bootstrapping data and the like. Each window may correspond to a plurality of clusters. It should be noted that in some examples, offset region may include the same number of clusters as windows. In one example, a window may include 32768 clusters. As described above, for standard compliant FAT volumes, the cluster size depends on the volume size. In this case, where a window includes 32768 clusters, a 64 GiB volume with a 32 kiB cluster size would include 64 windows, a 32 GiB FAT volume with a 16 kiB cluster size would also include 64 windows, a 16 GiB FAT volume with a 8 kiB cluster size would also include 64 windows, and a 8 GiB FAT volume a 4 kiB cluster size would also have 64 windows. As described above, page size for a central processing unit(s) 102 may be 4096 bytes. In the case where a window includes 32768 clusters, the number of clusters in a window is equal to the number of bits in a page size (i.e., 4096*8=32768).

It should be noted that for typical use cases the number of data objects requiring additional clusters to be allocated during a given time interval is usually fewer than 64. For example, in the case of DVRs, security camera recording applications, and the like, the number of video streams simultaneously being recorded is usually less than 64. It should be noted that in some examples, an allocation mapping structure map be partitioned into smaller or larger window sizes, including variable window sizes depending on an application. That is, the number of clusters included in a window may be dynamically reduced, so that the number of windows may be increased. In one example, to enable many small files (e.g., an .mp3 file, which would usually not exceed a few MiBs) to be written simultaneously, smaller windows may be placed at the front of the allocation mapping structure (e.g., the first half) and the remaining allocation mapping structure may include 32768 clusters per window size in order for larger files (e.g., several GiBs) to be simultaneously written. For example, a multimedia recording device may record several relatively smaller audio streams and fewer relatively larger video streams simultaneously.

Figure 7:
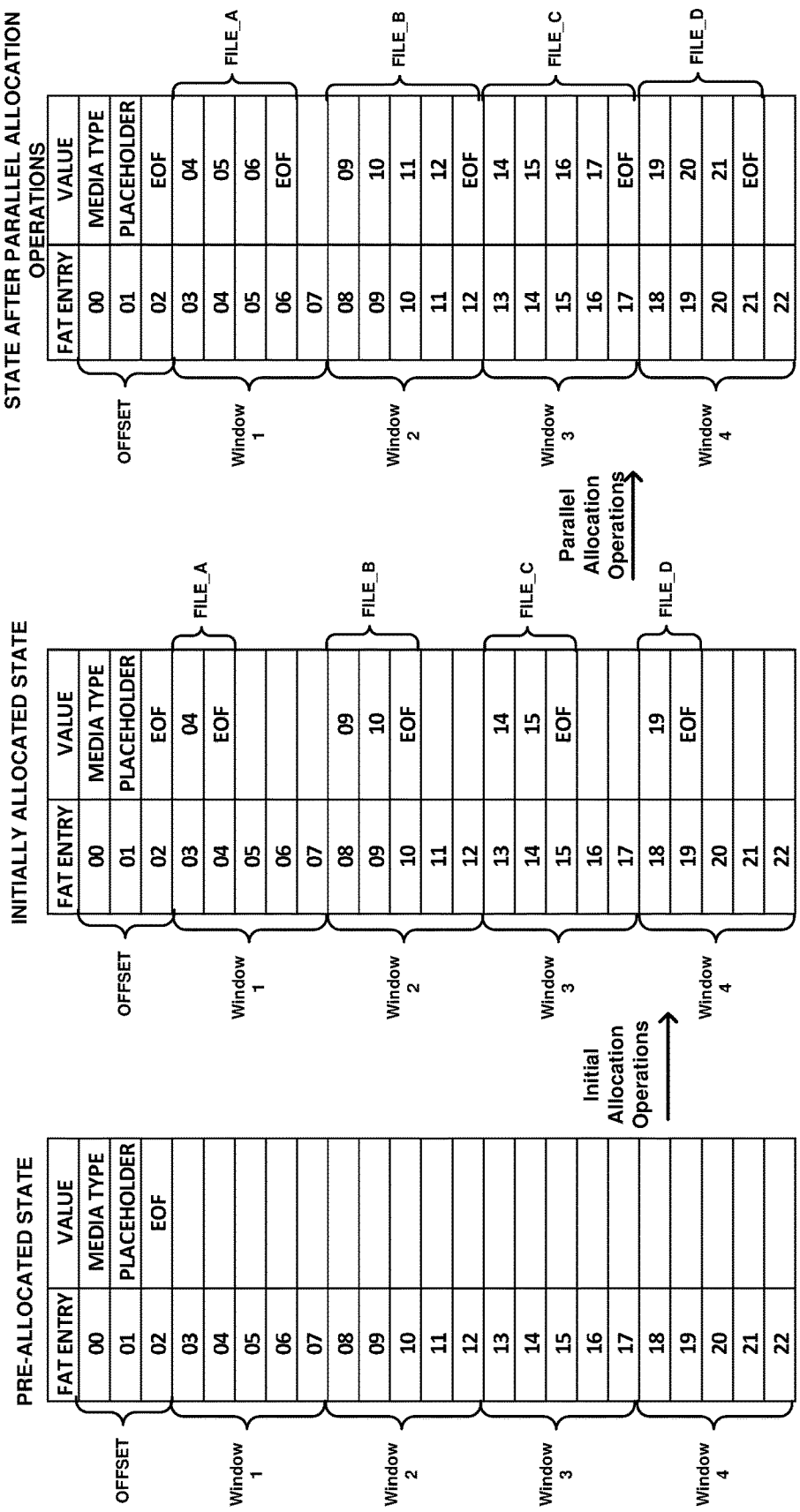
FIG. 7 is a conceptual diagram illustrating an example of causing respective allocation operations to be performed according to one or more techniques of this disclosure.

As described above, file system driver 206 may be configured to perform allocation operations based on an allocation mapping structure being logically partitioned into one or more of windows. FIG. 7 is a conceptual diagram illustrating an example of causing respective allocation operations to be performed according to one or more techniques of this disclosure. FIG. 7 illustrates an example where each of File_A, File_B, File_C, and File_D are initially allocated to a file allocation table, where the file allocation table is partitioned into a one or more of windows. FIG. 7 further illustrates where additional clusters are allocated for each of File_A, File_B, File_C, and File_D after an initial allocation. In the example illustrated in FIG. 7, two additional clusters are allocated to each File_A, File_B, File_C, and File_D after an initial allocation. That is, the example in FIG. 7 may be based on concurrent Write File_A, Write File_B, Write File_C, and Write File_D instructions, as described above with respect to FIG. 4 and FIGS. 5A-5B.

Referring to FIG. 7 the file allocation table includes four windows and each of File_A, File_B, File_C, and File_D are respectively initially allocated to Window 1, Window 2, Window 3, and Window 4. That is, when each of File_A, File_B, File_C, and File_D are initially stored to a volume (e.g., the files are opened or copied to a storage device) each is assigned a unique window. In one example, in order to protect information describing windows (which may be referred to as window metadata), when a window is assigned to a data object, a lock may be applied to window metadata. Locking window metadata may be referred to as applying a global lock. In one example, a global lock may include a spin lock. In one example, a global lock may include a mutual exclusion object (a mutex).

In some examples, window metadata may store information regarding one or more of the following: where a window starts and/or ends in the cluster heap, how many free clusters are in a window, the time when a window was last trimmed, and/or the number of users of a window. In one example, information regarding how many free clusters are in a window may include a free count value, where a free count value indicates the number of free clusters in a window. If a free count value for a window is equal to zero, the file system drivers 206 may determine that the window is full (i.e., has no clusters available for allocation). In one example, information regarding how many free clusters are in a window may include an in use count value, where an in use count value indicates the number of clusters of a window that are allocated. In one example, window metadata may include a flag structure allowing optional descriptive information to be selectively present, such as, whether a window includes available well aligned clusters regions (e.g., whether a window includes a sequence of at least 10 sequential clusters that are available for allocation, etc.). Further, in one example, well aligned clusters regions may refer to a sequence of sequential clusters beginning on an aligned boundary (which may depend on a storage media type) and having a size equal to the space between two alignment boundaries. Thus, for example, on flash memory, the flash erase block size may be used as the boundary and each sequential block may be one erase block in size. Further, window metadata may also include a number of users of a window field. A number of users field may indicate the number of data objects that are currently assigned to a window. Further, in some examples, a number of users field may indicate a number of active data objects assigned to a window. For example, if a file was created in a previous week and has not been modified since creation, it may be considered inactive. In some examples, when file drivers 206 assign a window to a data object, file drivers 206 may select a window to assign based on the number of data objects assigned to a window and/or the amount or type (well aligned cluster) of space available in a window. Window metadata is updated based on assignments.

FIG. 7 illustrates where each of File_A, File_B, File_C, and File_D are assigned a window and clusters are initially allocated to File_A, File_B, File_C, and File_D. That is, in the example illustrated in FIG. 7, initial allocation operations include locking window metadata, assigning a window to a file, upon completion of the assignment, unlocking the window metadata, locking the assigned window, and initially allocating clusters within the assigned window to the file. It should be noted that a global lock and a window lock are independent. That is, for example with respect to FIG. 7, a global lock may be applied for assigning Window 2 to File_B, while clusters are initially allocated within Window 1 to File_A. Referring again to FIG. 7, in the example illustrated in FIG. 7, Write File_A, Write File_B, Write File_C, and Write File_D instructions are received after an initial allocation for each of File_A, File_B, File_C, and File_D. In one example, file system drivers 206 may receive each of Write File_A, Write File_B, Write File_C, and Write File_D instructions during a specific time duration such that operations associated with the instructions may be executed in a simultaneous manner.

In the example illustrated in FIG. 7, allocation operations include locking a window assigned to a file, allocating two additional clusters within the window to the file, and upon completion of allocating additional clusters to the file, unlocking the window. As illustrated in FIG. 7, because each window is uniquely assigned to a file, the allocation operations may be performed in a parallel manner. That is, for example, allocations of clusters within windows are independent. Performing allocations in a parallel manner may enable data objects to be written to a storage device in a more efficient manner than serial allocations (e.g., file writing operations may be performed in shorter time period). Further, as illustrated with respect FIG. 7, uniquely assigning windows to files may prevent files from becoming interleaved and/or fragmented, which may improve performance of computing device 100. It should be noted that the example in FIG. 7 illustrates an initial allocation occurring for all of File_A, File_B, File_C, and File_D before additional clusters are allocated to any of File_A, File_B, File_C, and File_D, the techniques described herein may be applicable when instructions corresponding to initial allocations for a data object and instructions requiring additional clusters to be allocated to a data object are received in a random manner.

Figure 8:
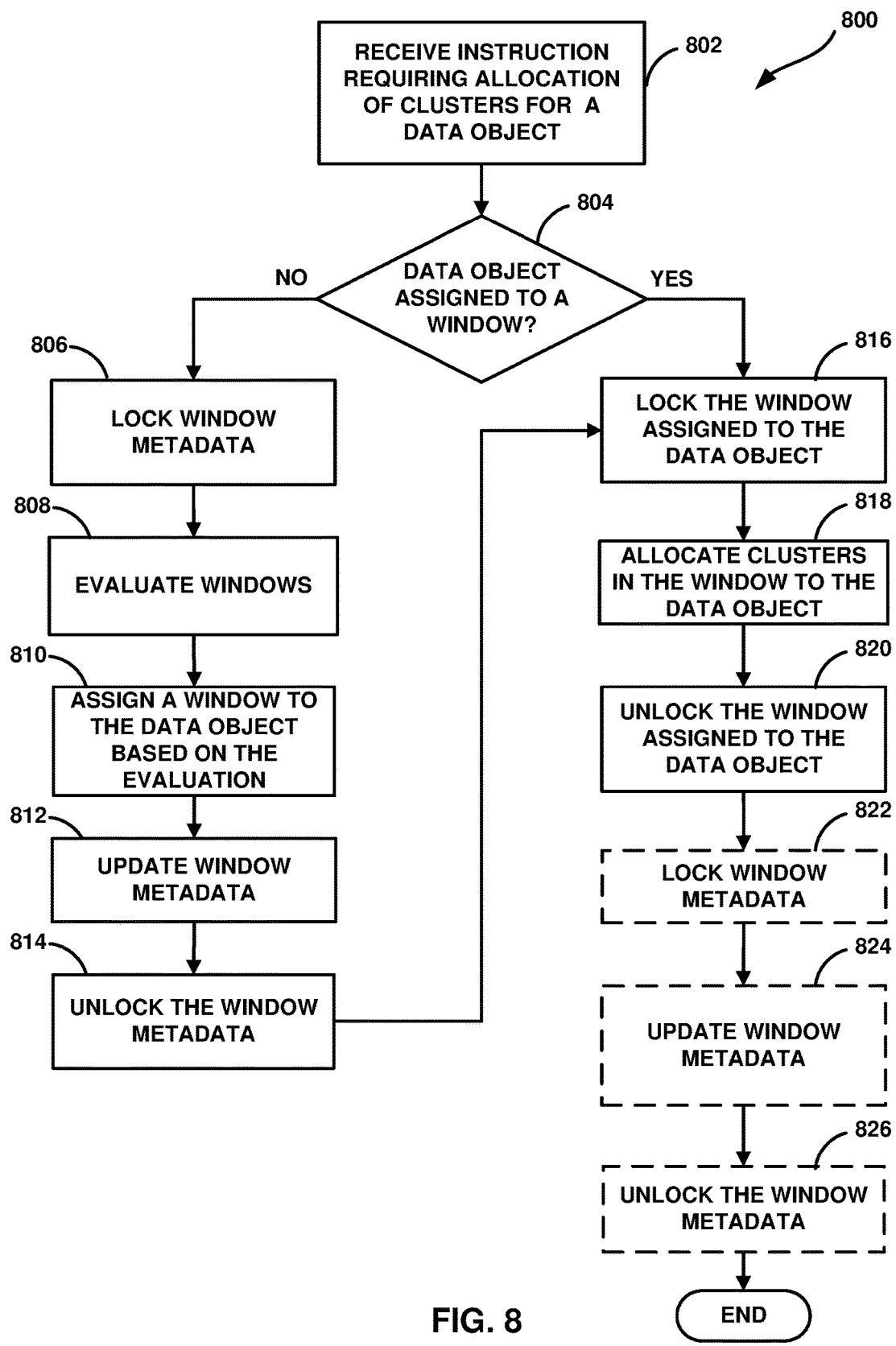
FIG. 8 is a flowchart illustrating an example of causing respective allocation operations to be performed according to one or more techniques of this disclosure.

FIG. 8 is a flowchart illustrating an example of causing respective data objects stored to a volume to be modified according to one or more techniques of this disclosure. It should be noted that although steps in FIG. 8 are described as being performed by file system drivers 206, steps illustrated in FIG. 8 may be performed by any and all combinations of hardware and software components of computing device 100. File system driver 206 receives an instruction requiring an allocation of clusters for a data object (802). As described above, an instruction requiring an allocation of clusters for a data object may include a write instruction received from an application. File system driver 206 determines whether the data object is assigned to a window (804). In some cases, an instruction may specify whether a data object is a new data object or an existing data object. For example, it may be inferred from an instruction to create a new file that the file is not currently assigned a window. Further, as described above, one or more records may map a data object to data a region (e.g., a first cluster field). One or more records or other types of data structures may be used to determine whether a data object is assigned to a window. Further, it should be noted that, in some examples, if a data object was already created, but is not currently cached in memory, it does not have a window assigned. In this case, data objects that are not active for a predetermined amount of time are thrown out of the cache and thus no longer have a window assigned. If a data object was already created and is cached in memory, then the in-memory cache of the data object (e.g., an in-memory inode structure) may point to the currently assigned window.

Upon determining that a window is not assigned to the data object, file system drivers 206 lock the window metadata (806). Window metadata may include any and all combinations of the types of window metadata described above. Further, as described above, locking window metadata may be referred to as a global lock and may include a spin lock or a mutex. File system drivers 206 evaluate one or more windows (808). For example, file system drivers 206 may rank one or more windows based on one or more metadata properties. For example, file system drivers 206 may provide a relatively high ranking for windows having a high number of free clusters and/or having a relatively few number of users (e.g., few active files assigned thereto). File system drivers 206 assign a window to the data object based on the evaluation (810). In one example, file system drivers 206 may assign the first evaluated window satisfying a minimum criteria to the data object. For example, if a window has values of zero for the number of users of a window and an in use count value, file system drivers 206 may assign the window the data object without evaluating any additional windows. In one example, file system driver 206 may evaluate a predetermined number of windows and may assign the window having the highest ranking to the data object. For example, in the case where windows have non-zero values for the number of users of a window and the in use count value, windows may be ranked based on whether well aligned clusters regions are available. Based on the window assigned to the data object, the window data is updated (812). It should be noted that updating the window metadata may include update a number of users value, updating values indicating a number of free clusters, etc. It should be noted that updating values indicating a number of free clusters essentially reserves space in the window for allocation of clusters for the data object. File system driver 206 unlocks the window metadata (814). As described above, unlocking window metadata may enabling subsequent assignments of windows to data objects to occur. Further, it should be noted that the updated window metadata may be used for evaluating windows for subsequent assignments.

Referring to FIG. 8, file system driver 206 locks the window assigned to the object (816). File system driver 206 allocates clusters in the window to the data object (818). In one example, allocating clusters in the window to the data object may include scanning bits in an allocation bitmap to find free clusters within the assigned window and allocating free clusters to the data object. File system driver 206 unlocks the window (820). It should be noted in some examples, file system drivers 206 may be configured to unlock the window within a predetermined time after allocation is completed. In this manner, the window may be kept busy for as long as a data object keeps being written to/allocated to, then when the allocation/writing is completed the window may be freed within the predetermine time period (e.g., 5 seconds). As described above, updating window metadata at 812 may essentially reserves space in the window for allocation of clusters for the data object. In some cases, it may be desirable or necessary to update window metadata based after an allocation occurs. For example, a data object may require more cluster than were initially allocated when a window was assigned. FIG. 8 illustrates where window metadata is optionally locked (822), updated (824), and unlocked (826) based on an actual allocation occurring. In this manner computing device 100 represents an example of a device configured to enable multiple data objects within a file system to be modified in a parallel manner of storage devices.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for allocating clusters for storage of a data object, the method comprising:
   receiving an instruction corresponding to an allocation of clusters to the data object, wherein a window of an allocation mapping structure has not been assigned to the data object;
   assigning a window in the allocation mapping structure to the data object, wherein assigning the window to the data object includes:
     locking a window metadata structure,
     evaluating one or more windows using metadata included in the window metadata structure, wherein evaluating one or more windows includes determining a number of users and a number of available clusters for one or more windows,
     assigning a window to the data object based on the evaluation,
     modifying the window metadata structure according to the assignment, and
     unlocking the modified window metadata structure;
   locking the window assigned to the data object;
   allocating clusters within the window assigned to the data object to the data object according to the received instruction; and
   unlocking the window assigned to the data object.

2. The method of claim 1, wherein a data object includes a file and an allocation mapping structure includes a file allocation table or an allocation bitmap and wherein a window includes a number of clusters.

3. The method of claim 2, wherein the number of clusters included in a window is equal to the number of bits in a page size of a central processing unit.

4. The method of claim 1, wherein locking a window metadata structure includes applying one of a spin lock or a mutual exclusion object.

5. The method of claim 1, wherein the allocation mapping structure includes windows having a size of 32768 clusters and further includes windows having a size of fewer than 32768 clusters.

6. The method of claim 1, wherein the windows metadata structure includes information indicating whether a window includes a sequence of at least 10 sequential clusters that are available for allocation.

7. The method of claim 1, wherein determining a number of users for one or more windows includes determining a number of active data objects assigned to a window.

8. A device for allocating clusters for storage of a data object comprising one or more processors configured to:
   receive an instruction corresponding to an allocation of clusters to the data object, wherein a window of an allocation mapping structure has not been assigned to the data object;
   assign a window in the allocation mapping structure to the data object, wherein assigning the window to the data object includes:
     locking a window metadata structure,
     evaluating one or more windows using metadata included in the window metadata structure, wherein evaluating one or more windows includes determining a number of users and a number of available clusters for one or more windows,
     assigning a window to the data object based on the evaluation,
     modifying the window metadata structure according to the assignment, and
     unlocking the modified window metadata structure;
   lock the window assigned to the data object;
   allocate clusters within the window assigned to the data object to the data object according to the received instruction; and
   unlock the window assigned to the data object.

9. The device of claim 8, wherein a data object includes a file and an allocation mapping structure includes a file allocation table or an allocation bitmap and wherein a window includes a number of clusters.

10. The device of claim 9, wherein the number of clusters included in a window is equal to the number of bits in a page size of a central processing unit.

11. The device of claim 8, wherein locking a window metadata structure includes applying one of a spin lock or a mutual exclusion object.

12. The device of claim 8, wherein the allocation mapping structure includes windows having a size of 32768 clusters and further includes windows having a size of fewer than 32768 clusters.

13. The device of claim 8, wherein the windows metadata structure includes information indicating whether a window includes a sequence of at least 10 sequential clusters that are available for allocation.

14. The device of claim 8, wherein determining a number of users for one or more windows includes determining a number of active data objects assigned to a window.

15. A non-transitory computer-readable storage medium comprising instructions stored thereon, that upon execution, cause one or more processors of a device to:
   receive an instruction corresponding to an allocation of clusters to the data object, wherein a window of an allocation mapping structure has not been assigned to the data object;
   assign a window in the allocation mapping structure to the data object, wherein assigning the window to the data object includes:
     locking a window metadata structure,
     evaluating one or more windows using metadata included in the window metadata structure, wherein evaluating one or more windows includes determining a number of users and a number of available clusters for one or more windows,
     assigning a window to the data object based on the evaluation,
     modifying the window metadata structure according to the assignment, and
     unlocking the modified window metadata structure;
   lock the window assigned to the data object;
   allocate clusters within the window assigned to the data object to the data object according to the received instruction; and
   unlock the window assigned to the data object.

16. The non-transitory computer-readable storage medium of claim 15, wherein a data object includes a file and an allocation mapping structure includes a file allocation table or an allocation bitmap, and wherein a window includes a number of clusters.

17. The non-transitory computer-readable storage medium of claim 16, wherein the number of clusters included in a window is equal to the number of bits in a page size of a central processing unit.

18. The non-transitory computer-readable storage medium of claim 15, wherein locking a window metadata structure includes applying one of a spin lock or a mutual exclusion object.

19. The non-transitory computer-readable storage medium of claim 15, wherein the allocation mapping structure includes windows having a size of 32768 clusters and further includes windows having a size of fewer than 32768 clusters.

20. The non-transitory computer-readable storage medium of claim 15, wherein the windows metadata structure includes information indicating whether a window includes a sequence of at least 10 sequential clusters that are available for allocation.

* * * * *